US012198594B2

(12) United States Patent
Hai

(10) Patent No.: US 12,198,594 B2
(45) Date of Patent: Jan. 14, 2025

(54) CHROMATICITY ADJUSTMENT METHOD AND DEVICE OF DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Bo Hai, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,533

(22) PCT Filed: Mar. 14, 2022

(86) PCT No.: PCT/CN2022/080692
§ 371 (c)(1),
(2) Date: Apr. 29, 2022

(87) PCT Pub. No.: WO2023/168726
PCT Pub. Date: Sep. 14, 2023

(65) Prior Publication Data

US 2024/0169877 A1 May 23, 2024

(30) Foreign Application Priority Data

Mar. 7, 2022 (CN) ......................... 202210214456.2

(51) Int. Cl.
*G09G 3/20* (2006.01)

(52) U.S. Cl.
CPC ... *G09G 3/2007* (2013.01); *G09G 2320/0666* (2013.01)

(58) Field of Classification Search
CPC ..................... G09G 3/2007; G09G 2320/0666
See application file for complete search history.

(56) References Cited

U.S. PATENT DOCUMENTS

2005/0207669 A1* 9/2005 Kameyama ............... G06T 5/50 382/168
2009/0268133 A1* 10/2009 Yoshimi ........... G02F 1/133371 349/107

(Continued)

FOREIGN PATENT DOCUMENTS

CN 104732949 A 6/2015
CN 106782303 A 5/2017

(Continued)

OTHER PUBLICATIONS

International Search Report in International application No. PCT/CN2022/080692, mailed on Dec. 5, 2022.

(Continued)

*Primary Examiner* — Kenneth B Lee, Jr.
(74) *Attorney, Agent, or Firm* — PV IP PC; Wei Te Chung

(57) ABSTRACT

The present application discloses a chromaticity adjustment method and an adjustment device of a display panel. The chromaticity adjustment method of the display panel includes: determining an initial driving voltage corresponding to a highest gray scale of the display panel; acquiring an initial white picture chromaticity of the display panel based on the initial driving voltage; determining whether the initial white picture chromaticity deviates from a target white picture chromaticity; if the initial white picture chromaticity deviates from the target white picture chromaticity, adjusting the initial driving voltage to adjust the initial white picture chromaticity.

17 Claims, 6 Drawing Sheets

(56) References Cited

U.S. PATENT DOCUMENTS

| | | | | |
|---|---|---|---|---|
| 2012/0236042 | A1* | 9/2012 | Parmar | G09G 3/3466 345/690 |
| 2014/0218411 | A1* | 8/2014 | Chen | G09G 3/3611 345/88 |
| 2021/0027727 | A1* | 1/2021 | Lee | G09G 5/06 |
| 2021/0407460 | A1 | 12/2021 | Wang et al. | |
| 2022/0310027 | A1* | 9/2022 | Hai | G09G 3/3607 |

FOREIGN PATENT DOCUMENTS

| | | | |
|---|---|---|---|
| CN | 107665676 | A | 2/2018 |
| CN | 107682682 | A | 2/2018 |
| CN | 108281109 | A | 7/2018 |
| CN | 109147702 | A | 1/2019 |
| CN | 109584835 | A | 4/2019 |
| CN | 109935219 | A | 6/2019 |
| CN | 110491330 | A | 11/2019 |
| CN | 112002288 | A | 11/2020 |
| EP | 1505566 | A2 | 2/2005 |
| JP | 2014109710 | A | 6/2014 |

OTHER PUBLICATIONS

Written Opinion of the International Searching Authority in International application No. PCT/CN2022/080692, mailed on Dec. 5, 2022.

Chinese Office Action in corresponding Chinese Patent Application No. 202210214456.2 dated Sep. 29, 2022, pp. 1-9.

* cited by examiner

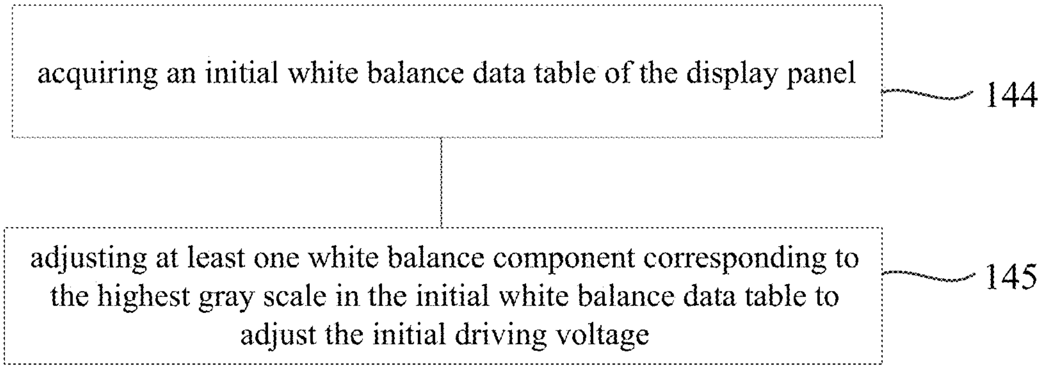
FIG. 3
| gray scale | R0 | G0 | B0 |
|---|---|---|---|
| 0 | 0 | 0 | 0 |
| 1 | 4 | 4 | 4 |
| 2 | 8 | 8 | 8 |
| 3 | 12 | 12 | 12 |
| ⋮ | ⋮ | ⋮ | ⋮ |
| 253 | 1012 | 1012 | 1012 |
| 254 | 1016 | 1016 | 1016 |
| 255 | 1020 | 1020 | 1020 |
FIG. 4
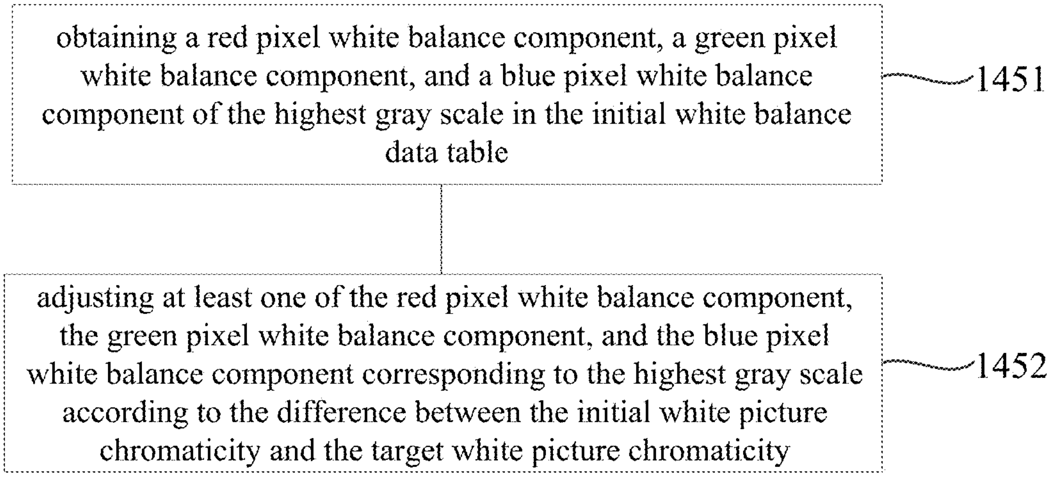
FIG. 5

| B0 | pixel driving voltage/V | Δx | Δy |
|---|---|---|---|
| 255 | 8.21 | 0.00 | 0.000 |
| 254 | 7.77 | 0.00 | 0.000 |
| 253 | 7.65 | 0.00 | 0.000 |
| 252 | 7.53 | 0.00 | 0.001 |
| 251 | 7.40 | 0.00 | 0.001 |
| 250 | 7.28 | 0.00 | 0.001 |
| 249 | 7.17 | 0.00 | 0.002 |
| 248 | 7.06 | 0.00 | 0.002 |
| 247 | 6.96 | 0.00 | 0.003 |
| 246 | 6.87 | 0.00 | 0.003 |
| 245 | 6.78 | 0.00 | 0.004 |
| 244 | 6.69 | 0.00 | 0.004 |
| 243 | 6.61 | 0.00 | 0.005 |
| 242 | 6.53 | 0.00 | 0.005 |
| 241 | 6.46 | 0.00 | 0.006 |
| 240 | 6.38 | 0.00 | 0.006 |
| 239 | 6.31 | 0.00 | 0.007 |
| 238 | 6.25 | 0.00 | 0.007 |
| 237 | 6.19 | 0.00 | 0.008 |
| 236 | 6.13 | 0.00 | 0.009 |
| 235 | 6.06 | 0.00 | 0.009 |
| 234 | 6.01 | 0.00 | 0.010 |
| 233 | 5.95 | 0.00 | 0.011 |
| 232 | 5.90 | 0.00 | 0.011 |
| 231 | 5.84 | 0.00 | 0.012 |
| 230 | 5.79 | 0.00 | 0.013 |
| 229 | 5.74 | 0.00 | 0.014 |
| 228 | 5.70 | 0.00 | 0.014 |
| 227 | 5.65 | 0.01 | 0.015 |
| 226 | 5.60 | 0.01 | 0.016 |
| 225 | 5.55 | 0.01 | 0.017 |
| 224 | 5.51 | 0.01 | 0.018 |
| 223 | 5.47 | 0.01 | 0.019 |
| 222 | 5.45 | 0.01 | 0.019 |
| 221 | 5.43 | 0.01 | 0.020 |
| 220 | 5.41 | 0.01 | 0.021 |
| 219 | 5.39 | 0.01 | 0.022 |
| 218 | 5.37 | 0.01 | 0.023 |
| 217 | 5.35 | 0.01 | 0.024 |
| 216 | 5.34 | 0.01 | 0.025 |
| 215 | 5.32 | 0.01 | 0.026 |
| 214 | 5.30 | 0.01 | 0.026 |
| 213 | 5.29 | 0.01 | 0.027 |
| 212 | 5.27 | 0.01 | 0.028 |
| 211 | 5.25 | 0.01 | 0.029 |
| 210 | 5.24 | 0.01 | 0.030 |

FIG. 8

CHROMATICITY ADJUSTMENT METHOD AND DEVICE OF DISPLAY PANEL

BACKGROUND

Field of Invention

The present application relates to a display field, and particularly to a chromaticity adjustment method and an adjustment device of a display panel.

Description of Prior Art

At present, in a display module comprising, for example, a liquid crystal display panel, a pixel unit is usually composed of a red sub-pixel, a green sub-pixel, and a blue sub-pixel. By controlling a driving voltage of each sub-pixel, a color required for a display panel to display a color image is mixed. Generally, a white picture chromaticity of the display module is jointly determined by a backlight module and a display panel. A same backlight module of a customer needs to be compatible with different specifications of display panels.

When the customer does not change a design of the backlight module, it is necessary to adjust the liquid crystal display panel to make the white picture chromaticity of the display module meet requirements of a target white picture chromaticity. However, after the design of the display panel is determined, it is generally not desirable to make major changes to the display panel, which limits improvement of chromaticity of the display panel.

Therefore, it is urgent to propose a technical scheme that can improve the white picture chromaticity of the display panel without changing the design and manufacturing processes of the display panel.

SUMMARY

The present application provides a chromaticity adjustment method of a display panel, so as to improve a white picture chromaticity of the display panel without changing a design and manufacturing processes of the display panel.

The present application provides a chromaticity adjustment method of a display panel, comprising:

- determining an initial driving voltage corresponding to a highest gray scale of the display panel;
- acquiring an initial white picture chromaticity of the display panel based on the initial driving voltage;
- determining whether the initial white picture chromaticity deviates from a target white picture chromaticity; and
- if the initial white picture chromaticity deviates from the target white picture chromaticity, adjusting the initial driving voltage to adjust the initial white picture chromaticity.

Alternatively, in some embodiments of the present application, a step of determining the initial driving voltage corresponding to the highest gray scale of the display panel comprises:

- determining an initial driving voltage corresponding to a highest gray scale according to a white picture transmission rate of the display panel.

Alternatively, in some embodiments of the present application, a step of adjusting the initial driving voltage comprises:

- if the initial white picture chromaticity is lower than the target white picture chromaticity, and the initial driving voltage comprises a first pixel driving voltage, a second pixel driving voltage, and a third pixel driving voltage, adjusting the third pixel driving voltage.

Alternatively, in some embodiments of the present application, a step of adjusting the third pixel driving voltage comprises:

- reducing the third pixel driving voltage with a preset amplitude according to a difference between the initial white picture chromaticity and the target white picture chromaticity;
- acquiring an adjusted initial white picture chromaticity, and determining the third pixel driving voltage if a difference between the adjusted initial white picture chromaticity and the target white picture chromaticity is less than a preset value; and
- if the difference between the adjusted initial white picture chromaticity and the target white picture chromaticity is greater than the preset value, continuing to reduce the third pixel driving voltage until the difference between the adjusted initial white picture chromaticity and the target white picture chromaticity is less than the preset value.

Alternatively, in some embodiments of the present application, the first pixel driving voltage is a red pixel driving voltage, the second pixel driving voltage is a green pixel driving voltage, and the third pixel driving voltage is a blue pixel driving voltage.

Alternatively, in some embodiments of the present application, a step of adjusting the initial driving voltage further comprises:

- if the initial white picture chromaticity is higher than the target white picture chromaticity, and the initial driving voltage comprises the first pixel driving voltage, the second pixel driving voltage, and the third pixel driving voltage, adjusting the first pixel driving voltage and/or adjusting the second pixel driving voltage.

Alternatively, in some embodiments of the present application, the first pixel driving voltage is a red pixel driving voltage, the second pixel driving voltage is a green pixel driving voltage, and the third pixel driving voltage is a blue pixel driving voltage.

Alternatively, in some embodiments of the present application, a step of adjusting the initial driving voltage comprises:

- acquiring an initial white balance data table of the display panel; and
- adjusting at least one white balance component corresponding to the highest gray scale in the initial white balance data table to adjust the initial driving voltage.

Alternatively, in some embodiments of the present application, a step of adjusting at least one white balance component corresponding to the highest gray scale in the initial white balance data table comprises:

- obtaining a red pixel white balance component, a green pixel white balance component, and a blue pixel white balance component of the highest gray scale in the initial white balance data table; and
- adjusting at least one of the red pixel white balance component, the green pixel white balance component, and the blue pixel white balance component corresponding to the highest gray scale according to a difference between the initial white picture chromaticity and the target white picture chromaticity.

Alternatively, in some embodiments of the present application, a step of adjusting the at least one white balance component corresponding to the highest gray scale in the initial white balance data table of the display panel comprises:

pre-configuring a corresponding relationship table between different gray scales and chromaticity changes of the at least one white balance component; and looking up the corresponding relationship table according to a difference between the initial white picture chromaticity and the target white picture chromaticity to match a corresponding one of the white balance component.

Alternatively, in some embodiments of the present application, a step of pre-configuring the corresponding relationship table between the different gray scales and the chromaticity changes of the at least one white balance component comprises:

acquiring a first color coordinate corresponding to the initial white picture chromaticity;

reducing at least one white balance component corresponding to the highest gray scale, keeping other white balance components corresponding to the highest gray scale unchanged, and recording a corresponding white picture chromaticity at intervals of at least one gray scale in sequence to obtain a plurality of corresponding second color coordinates; and calculating a difference between each of the second color coordinates and the first color coordinate respectively to obtain the corresponding relationship table.

Alternatively, in some embodiments of the present application, the chromaticity adjustment method of the display panel further comprises:

adjusting other gray scales of the display panel according to an adjusted initial white picture chromaticity, so that a gray scale picture chromaticity of the display panel matches a white picture chromaticity.

The present application further provides a chromaticity adjustment method of a display panel, comprising:

determining an initial driving voltage corresponding to a highest gray scale according to a white picture transmission rate of the display panel;

acquiring an initial white picture chromaticity of the display panel based on the initial driving voltage;

determining whether the initial white picture chromaticity deviates from a target white picture chromaticity;

if the initial white picture chromaticity deviates from the target white picture chromaticity, adjusting the initial driving voltage to adjust the initial white picture chromaticity; and adjusting other gray scales of the display panel according to an adjusted initial white picture chromaticity, so that a gray scale picture chromaticity of the display panel matches a white picture chromaticity.

Alternatively, in some embodiments of the present application, a step of adjusting the initial driving voltage comprises:

if the initial white picture chromaticity is lower than the target white picture chromaticity, and the initial driving voltage comprises a first pixel driving voltage, a second pixel driving voltage, and a third pixel driving voltage, adjusting the third pixel driving voltage.

Alternatively, in some embodiments of the present application, a step of adjusting the third pixel driving voltage comprises:

reducing the third pixel driving voltage with a preset amplitude according to a difference between the initial white picture chromaticity and the target white picture chromaticity;

acquiring an adjusted initial white picture chromaticity, and determining the third pixel driving voltage if a difference between the adjusted initial white picture chromaticity and the target white picture chromaticity is less than a preset value; and if the difference between the adjusted initial white picture chromaticity and the target white picture chromaticity is greater than the preset value, continuing to reduce the third pixel driving voltage until the difference between the adjusted initial white picture chromaticity and the target white picture chromaticity is less than the preset value.

Alternatively, in some embodiments of the present application, the first pixel driving voltage is a red pixel driving voltage, the second pixel driving voltage is a green pixel driving voltage, and the third pixel driving voltage is a blue pixel driving voltage.

Alternatively, in some embodiments of the present application, a step of adjusting the initial driving voltage comprises:

acquiring an initial white balance data table of the display panel; and adjusting at least one white balance component corresponding to the highest gray scale in the initial white balance data table to adjust the initial driving voltage.

Alternatively, in some embodiments of the present application, a step of adjusting the at least one white balance component corresponding to the highest gray scale in the initial white balance data table comprises:

obtaining a red pixel white balance component, a green pixel white balance component, and a blue pixel white balance component of the highest gray scale in the initial white balance data table; and adjusting at least one of the red pixel white balance component, the green pixel white balance component, and the blue pixel white balance component corresponding to the highest gray scale according to the difference between the initial white picture chromaticity and the target white picture chromaticity.

Alternatively, in some embodiments of the present application, the step of adjusting the at least one white balance component corresponding to the highest gray scale in the initial white balance data table of the display panel comprises:

pre-configuring a corresponding relationship table between different gray scales and chromaticity changes of the at least one white balance component; and looking up the corresponding relationship table according to the difference between the initial white picture chromaticity and the target white picture chromaticity to match the a corresponding one of the white balance component.

Accordingly, the present application further provides a chromaticity adjustment device for a display panel, comprising:

a first acquisition module for determining an initial driving voltage corresponding to a highest gray scale of the display panel;

a second acquisition module for acquiring an initial white picture chromaticity of the display panel based on the initial driving voltage;

a detection module for determining whether the initial white picture chromaticity deviates from a target white picture chromaticity; and an adjustment module for adjusting the initial driving voltage to adjust the initial white picture chromaticity when the initial white picture chromaticity deviates from the target white picture chromaticity.

The present application provides a chromaticity adjustment method and device of a display panel. In the chromaticity adjustment method of the display panel, first, determine an initial driving voltage corresponding to a highest gray scale of the display panel. And then acquire an initial white picture chromaticity of the display panel based on the initial driving voltage. If the initial white picture chromaticity deviates from a target white picture chroma, adjusting the initial driving voltage to adjust the initial white picture chromaticity. Therefore, the present application can adjust the white picture chromaticity of the display panel by adjusting the initial driving voltage corresponding to the highest gray scale of the display panel. That is, without changing the design and manufacturing process of the display panel, the white picture chromaticity of the display panel can be improved through optical debugging to meet the customer's specification requirements for the white picture chromaticity of the module.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

FIG. 3 is a second flow diagram of step 104 in FIG. 1 provided by the present application.

FIG. 4 is a schematic diagram of an initial white balance data table provided by the present application.

FIG. 5 is a first flow diagram of step 145 in FIG. 3 provided by the present application.

FIG. 8 is a corresponding relationship table between different gray scales of a blue pixel white balance component and chromaticity changes provided in the present application.

DETAILED DESCRIPTION OF PREFERRED EMBODIMENTS

Figure 1:
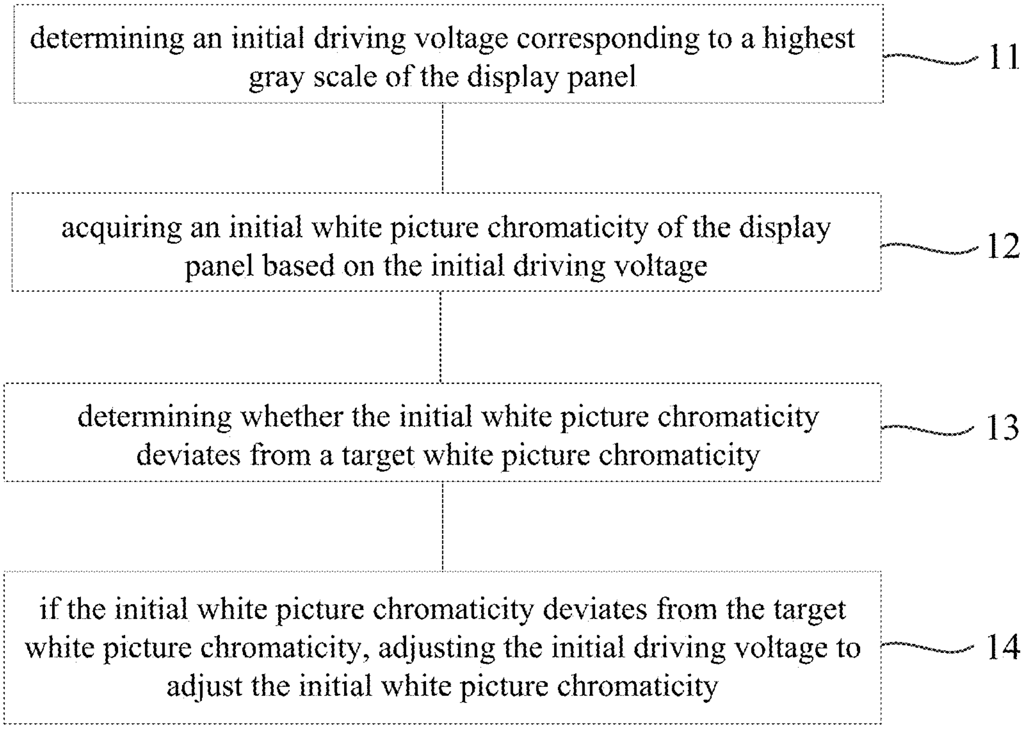
FIG. 1 is a first flow diagram of a chromaticity adjustment method of a display panel provided by the present application.

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application. In addition, it should be understood that the specific embodiments described herein are only used to illustrate and explain the present application and are not used to limit the present application. In addition, it should be understood that the terms "first" and "second" are only used for descriptive purposes and cannot be understood as indicating or implying relative importance or implicitly indicating the number of indicated technical features. Thus, the features defining "first" and "second" may explicitly or implicitly include one or more of the features.

The present application provides a chromaticity adjustment method and device of a display panel described in detail below. It should be noted that the order of description of the following embodiments does not limit the preferred order of the embodiments of the present application.

In the chromaticity adjustment method of the display panel provided by the embodiments of the present application, first, determine an initial driving voltage corresponding to a highest gray scale of the display panel. And then acquire an initial white picture chromaticity of the display panel based on the initial driving voltage. Next, determine whether the initial white picture chromaticity deviates from a target white picture chromaticity. If the initial white picture chromaticity deviates from the target white picture chromaticity, adjusting the initial driving voltage corresponding to the highest gray scale to adjust the initial white picture chromaticity.

The highest gray scale of the display panel is determined according to an image display data of the display panel. For example, if the image display data of the display panel is binary 8 bit, the highest gray scale of the display panel is 255 gray scale. If the image display data of the display panel is binary 10 bit, the highest gray scale of the display panel is 1023 gray scale. It will not be repeated here.

The initial driving voltage corresponding to the highest gray scale can comprise a plurality of voltages, which can be determined according to a pixel architecture of the display panel. For example, if the display panel comprises red sub-pixels, green sub-pixels, and blue sub-pixels, the initial driving voltage corresponding to the highest gray scale comprises a red pixel driving voltage, a green pixel driving voltage, and a blue pixel driving voltage. If the display panel comprises red sub-pixels, green sub-pixels, blue sub-pixels, and white sub-pixels, the initial driving voltage corresponding to the highest gray scale comprises a red pixel driving voltage, a green pixel driving voltage, a blue pixel driving voltage, and a white pixel driving voltage. It will not be repeated here.

As can be seen from the above, adjust the initial driving voltage corresponding to the highest gray scale, that is, adjust the driving voltage of different color sub-pixels corresponding to the highest gray scale. Thus, a proportion of each color component forming the white picture is changed, and the white picture chromaticity is changed.

Therefore, the embodiments of the present application can adjust the white picture chromaticity by adjusting the initial driving voltage corresponding to the highest gray scale of the display panel. That is, without changing the design and manufacturing processes of the display panel, the white picture chromaticity of the display panel can be improved through optical debugging to meet customer's specification requirements for the white picture chromaticity of a module.

This is described in detail below.

Please refer to FIG. 1. FIG. 1 is a first flow diagram of a chromaticity adjustment method of a display panel provided by the present application. In the embodiments of the present application, the chromaticity adjustment method of the display panel specifically comprises the following steps:

11. determining an initial driving voltage corresponding to a highest gray scale of the display panel.

Specifically, the initial driving voltage corresponding to the highest gray scale can be determined according to the white picture transmission rate of the display panel. Or the initial driving voltage corresponding to the highest gray scale can be determined according to other display factors such as picture color saturation of the display panel, which will not be repeated here.

In the embodiments of the present application, the initial driving voltage corresponding to the highest gray scale can be determined according to the white picture transmission rate of the display panel.

It is understandable that transmittance of the display panel is related to a brightness, which is an important parameter to be considered in a design of the display panel. Different types of display panels require different white picture transmission rate. The brightness of the display panel is related to the driving voltage. The higher the driving voltage, the higher brightness of a display picture of the display panel. Therefore, the initial driving voltage corresponding to the highest gray scale can be determined according to the white picture penetration of the display panel.

Specifically, on one hand, under normal circumstances, the higher the driving voltage, the higher the transmission rate of the display panel and gradually tends to saturation. On another hand, during an initial setting, driving voltages of different color sub-pixels corresponding to the highest gray scale of the display panel are same. For example, the highest gray scale driving voltages of RGB sub-pixels are 14V. Based on this, a driving voltage of each pixel corresponding to the highest gray scale can be adjusted until it is adjusted to the white picture transmission rate required by the display panel or there is no change in the white picture transmission rate with a change of each driving voltage. At this time, the initial driving voltage corresponding to the highest gray scale can be obtained.

12. acquiring an initial white picture chromaticity of the display panel based on the initial driving voltage.

It is understandable that a white picture refers to a white picture displayed by the display panel driven by the highest gray scale. Therefore, the white picture can be displayed by driving the display panel with the initial driving voltage corresponding to the highest gray scale determined in the step 11.

Wherein, color is represented by brightness and chromaticity. Chromaticity is a property of color excluding brightness. It reflects a hue and saturation of color.

Wherein, the initial white picture chromaticity of the display panel can be obtained. When a picture of the display panel is white, a color of a color point in the picture can be obtained, and then the color of the color point can be substituted into a CIE 1931 color coordinates to obtain a color coordinate of the initial white picture chromaticity. Among them, the initial white picture chromaticity comprises an x coordinate and a Y coordinate.

It is understandable that CIE 1931 color coordinates establish three hypothetical standard primary colors: red (x), green (y), and blue (z), because $x+y+z=1$. Therefore, only the x coordinate and y coordinate of the initial white picture chromaticity need to be given to represent the initial white picture chromaticity.

13. determining whether the initial white picture chromaticity deviates from a target white picture chromaticity.

It is understandable that when assembling a display module, a backlight module can match different display panels. Different backlight modules may require the display panel to have different target white picture chromaticity. The target white picture chromaticity also comprises an x coordinate and a y coordinate. The x and y coordinates of the initial white picture chromaticity are compared with the x and y coordinates of the target white picture chromaticity to determine whether the initial white picture chromaticity deviates from the target white picture chromaticity.

Specifically, the x coordinate of the initial white picture chromaticity and the x coordinate of the target white picture chromaticity are subtracted. They coordinate of the initial white picture chromaticity and the y coordinate of the target white picture chromaticity are subtracted. According to differences obtained, it is determined whether the initial white picture chromaticity deviates from the target white picture chromaticity. For example, when the x and y coordinates of the initial white picture chromaticity are completely equal to the x and y coordinates of the target white picture chromaticity, it is determined that the initial white picture chromaticity does not deviate from the target white picture chromaticity. Alternatively, a preset value is set, and when any of the obtained differences is less than the preset value, it is determined that the initial white picture chromaticity does not deviate from the target white picture chromaticity. On the contrary, it is determined that the initial white picture chromaticity deviates from the target white picture chromaticity.

14. if the initial white picture chromaticity deviates from the target white picture chromaticity, adjusting the initial driving voltage to adjust the initial white picture chromaticity.

From the above analysis, it can be seen that adjusting the initial driving voltage corresponding to the highest gray scale, that is, adjusting the driving voltages of different color sub-pixels corresponding to the highest gray scale, can change the proportion of each color component forming the white picture, so as to adjust the white picture chromaticity.

Specifically, the difference between the initial white picture chromaticity and the target white picture chromaticity can be a negative value or a positive value. That is, the initial white picture chromaticity can be higher than the target white picture chromaticity, and the initial white picture chromaticity can also be lower than the target white picture chromaticity.

In the embodiments of the present application, the initial driving voltage can comprise a first pixel driving voltage, a second pixel driving voltage, and a third pixel driving voltage. If the initial white picture chromaticity deviates from the target white picture chromaticity, at least one of the first pixel driving voltage, the second pixel driving voltage, and the third pixel driving voltage can be adjusted. For example, if the first pixel driving voltage and/or the second pixel driving voltage are increased or reduced, the white picture chromaticity can be reduced. And increasing or reducing the third pixel driving voltage can increase the white picture chromaticity. Then, when the initial white picture chromaticity is lower than the target white picture chromaticity, the third pixel driving voltage can be adjusted. And when the initial white picture chromaticity is higher than the target white picture chromaticity, the first pixel driving voltage can be adjusted, and/or the second pixel driving voltage can be adjusted.

The colors of the first pixel, the second pixel, and the third pixel can be determined by the pixel architecture of the display panel. Influence of the first pixel, the second pixel, and the third pixel on the white picture chromaticity can be tested according to an actual display picture of the display panel, which is not limited in the present application.

Specifically, in the display panel of some embodiments of the present application, a pixel unit is usually composed of a red sub-pixel, a green sub-pixel, and a blue sub-pixel. It is found that the conventional characteristic of the display panel is that only reducing the blue pixel driving voltage corresponding to the highest gray scale can improve the x coordinate and y coordinate of the white picture chromaticity at a same time, so as to improve the white picture chromaticity. Only the red pixel driving voltage corresponding to the highest gray scale is reduced, which mainly reduces the x coordinate of the white picture chromaticity, so as to reduce the white picture chromaticity. Only the green pixel driving voltage corresponding to the highest gray scale is reduced, which mainly reduces the y coordinate of the white picture chromaticity, so as to reduce the white picture chromaticity.

Therefore, according to the difference between the initial white picture chromaticity and the target white picture chromaticity, when the initial white picture chromaticity is low, the blue pixel driving voltage corresponding to the highest gray scale is reduced. When the x coordinate of the white picture chromaticity is high, the red pixel driving voltage corresponding to the highest gray scale is reduced. When the y coordinate of the initial white picture chromaticity is high, the green pixel driving voltage corresponding to the highest gray scale is reduced. Of course, when the x coordinate and y coordinate of the chromaticity of the initial white picture are high, the red pixel driving voltage and green pixel driving voltage corresponding to the highest gray scale can be reduced at a same time. According to a degree of highness of x coordinate and Y coordinate, a reduction range of red pixel driving voltage and green pixel driving voltage corresponding to the highest gray scale is determined.

Of course, in other embodiments of the present application, the color of each sub-pixel can also be determined according to the driving architecture of the display panel. Then, the driving voltage of the corresponding color sub-pixel is adjusted according to a deviation degree between the initial white picture chromaticity and the target white picture chromaticity.

Figure 2:
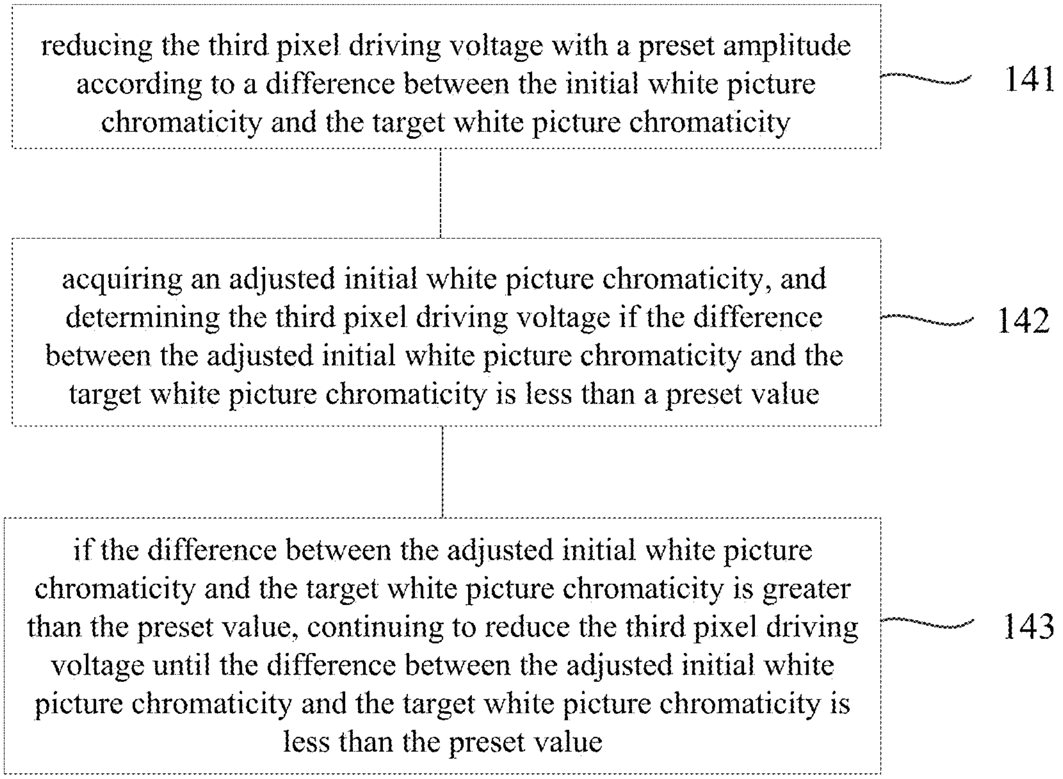
FIG. 2 is a first flow diagram of step 104 in FIG. 1 provided by the present application.

Please refer to FIG. 2. FIG. 2 is a first flow diagram of step 14 in FIG. 1 provided by the present application. In the embodiments of the present application, the first pixel is red pixel, the second pixel is green pixel, and the third pixel is blue pixel. And when the original white picture chromaticity is lower than the target white picture chromaticity, the third pixel driving voltage corresponding to the highest gray scale is directly reduced as an example. At this time, the step of adjusting the third pixel driving voltage comprises:

141. reducing the third pixel driving voltage with a preset amplitude according to a difference between the initial white picture chromaticity and the target white picture chromaticity.

Specifically, keep the first pixel driving voltage corresponding to the highest gray scale and the second pixel driving voltage corresponding to the highest gray scale unchanged, and slightly reduce the third pixel driving voltage corresponding to the highest gray scale with a preset amplitude. The preset amplitude is determined according to the difference between the initial white picture chromaticity and the target white picture chromaticity.

142. acquiring an adjusted initial white picture chromaticity, and determining the third pixel driving voltage if a difference between the adjusted initial white picture chromaticity and the target white picture chromaticity is less than a preset value.

It is understandable that different customers have different requirements for the target white picture chromaticity of a same display panel. Therefore, the third pixel driving voltage corresponding to the highest gray scale can be reduced by a small margin. Then, the display panel is driven to display the white picture according to an adjusted pixel driving voltage corresponding to the highest gray scale, and the adjusted initial white picture chromaticity is obtained. If the difference between the adjusted initial white picture chromaticity and the target white picture chromaticity is less than a preset value, it is determined that the third pixel driving voltage adjusted is the third pixel driving voltage corresponding to the highest gray scale.

143. if the difference between the adjusted initial white picture chromaticity and the target white picture chromaticity is greater than the preset value, continuing to reduce the third pixel driving voltage until the difference between the adjusted initial white picture chromaticity and the target white picture chromaticity is less than the preset value.

It is understandable that driving the display panel according to the adjusted third pixel driving voltage corresponding to the highest gray scale can improve the white picture chromaticity of the display panel and actually affect brightness of the white picture. Therefore, in a process of actually adjusting the third pixel driving voltage corresponding to the highest gray scale, gradually reduce the third pixel driving voltage, so as to ensure that the brightness of the white picture is less affected while improving the white picture chromaticity of the display panel.

Therefore, if the adjusted white picture chromaticity is still lower than the target white picture chromaticity, it is necessary to continue to reduce the third pixel driving voltage corresponding to the highest gray scale until the difference between the adjusted white picture chromaticity and the target white picture chromaticity is less than the preset value. It should be noted that the embodiments of the present application set a reduction amplitude of the third pixel driving voltage according to the difference between the initial white picture chromaticity and the target white picture chromaticity, so that an adjustment of the third pixel driving voltage is more accurate and rapid.

It is understandable that in other embodiments of the present application, a direct adjustment process of the first pixel driving voltage and/or the second pixel driving voltage corresponding to the highest gray scale can also refer to the above content, which will not be repeated here.

In some embodiments of the present application, the initial driving voltage corresponding to the highest gray scale can also be adjusted by adjusting white balance components of the highest gray scale in an initial white balance data table.

Specifically, please refer to FIG. 3. FIG. 3 is a second flow diagram of step 14 in FIG. 1 provided by the present application. The step 14 comprises the following steps:

144. acquiring an initial white balance data table of the display panel.

Specifically, please also refer to FIG. 4. FIG. 4 is a schematic diagram of an initial white balance data table provided by the present application. The present application takes the example that the image display data of the display panel is binary 8 bit, that is, 256 scales of different brightness gray scales are generated (for example, recorded as a 0th gray scale to a 255th gray scale), but it cannot be understood as a limitation of the present application.

As shown in FIG. 4, in the initial white balance data table, each gray scale corresponds to a red pixel white balance component (RO), a green pixel white balance component (GO), and a blue pixel white balance component (BO). The initial white balance data table is a linear data table, that is, values of the red pixel white balance component RO, the green pixel white balance component GO, and the blue pixel white balance component BO corresponding to any gray scale are a same gray scale value.

The initial white balance data table indicates that 8 bit image display data is transformed into 10-bit or 12-bit image display data. For example, gray scale 2 in the 8 bit image display data is equivalent to gray scale 8 in the 10 bit image display data, gray scale 3 in the 8 bit image display data is equivalent to gray scale 12 in the 10 bit image display data, gray scale 255 in the 8 bit image display data is equivalent to gray scale 1020 in the 10 bit image display data, etc. Since the 8 bit image display data is converted into 10 bit image display data, an adjustable range between original adjacent gray scales is increased. Therefore, it is more convenient to adjust the white balance components on the basis of the initial white balance data table. It should be noted that white balance adjustment is a technology well known to those skilled in the art and will not be repeated here.

145. adjusting at least one white balance component corresponding to the highest gray scale in the initial white balance data table to adjust the initial driving voltage.

It is understandable that since the highest gray scale corresponds to the white picture of the display panel, and the white balance components in the initial white balance data table are the gray scale values, which corresponds to the driving voltages. Adjusting the white balance components is adjusting the driving voltages. Therefore, the present application can adjust the white picture chromaticity by adjusting at least one white balance component corresponding to the highest gray scale of the display panel in the initial white balance data table. That is, without changing the design and manufacturing processes of the display panel, the white picture chromaticity of the display panel can be improved through optical debugging to meet the customer's specification requirements for the white picture chromaticity of the module.

Further, in some embodiments of the present application, please refer to FIG. 5. FIG. 5 is a first flow diagram of step 145 in FIG. 3 provided by the present application. In the embodiment, the step 145 comprises the following steps:

1451. obtaining a red pixel white balance component, a green pixel white balance component, and a blue pixel white balance component of the highest gray scale in the initial white balance data table.

It is understandable that in the display panel, a pixel unit is usually composed of a red sub-pixel, a green sub-pixel, and a blue sub-pixel. Therefore, the initial white balance data table comprises a red pixel white balance component, a green pixel white balance component, and a blue pixel white balance component. After obtaining the red pixel white balance component, the green pixel white balance component, and the blue pixel white balance component, an adjustment action in subsequent steps can be performed.

1452. adjusting at least one of the red pixel white balance component, the green pixel white balance component, and the blue pixel white balance component corresponding to the highest gray scale according to the difference between the initial white picture chromaticity and the target white picture chromaticity.

Specifically, in order to reduce the driving voltage corresponding to the highest gray scale, at least one of the red pixel white balance component, the green pixel white balance component, and the blue pixel white balance component corresponding to the highest gray scale in the initial white balance data table can be adjusted through a white balance adjustment function of a timer controller (timer controller, TCON). That is, according to the above analysis, if the initial white picture chromaticity is lower than the target white picture chromaticity, then the blue pixel white balance component corresponding to the highest gray scale is reduced. If the initial white picture chromaticity is higher than the target white picture chromaticity, then the green pixel white balance component corresponding to the highest gray scale is reduced, and/or the red pixel white balance component corresponding to the highest gray scale is reduced.

Specifically, the TCON can directly adjust at least one of the red pixel white balance component, the green pixel white balance component, and the blue pixel white balance component corresponding to the highest gray scale according to the adjustment process shown in FIG. 2, which will not be repeated here.

Of course, in some embodiments of the present application, the TCON can also adjust at least one of the red pixel white balance component, the green pixel white balance component, and the blue pixel white balance component corresponding to the highest gray scale according to a look-up table function.

Figure 6:
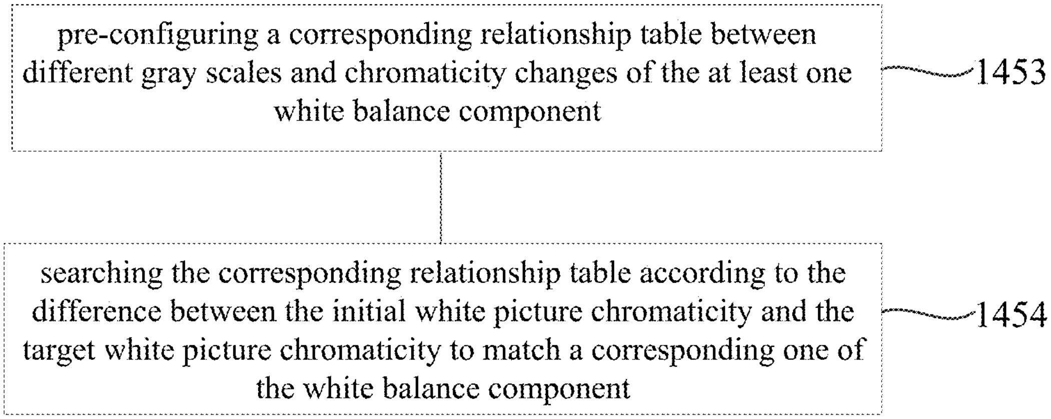
FIG. 6 is a second flow diagram of step 145 in FIG. 3 provided by the present application.

Please refer to FIG. 6. FIG. 6 is a second flow diagram of step 145 in FIG. 3 provided by the present application. In the embodiment, the step 145 comprises the following steps:

1453. pre-configuring a corresponding relationship table between different gray scales and chromaticity changes of the at least one white balance component.

From the above analysis, it can be seen that the display panel will display white pictures with different chromaticity under different pixel driving voltages corresponding to the highest gray scale. Therefore, the corresponding relationship tables between different white balance components and chromaticity changes can be configured.

Thus, after detecting the pixel driving architecture type of the display panel, the corresponding relationship table of different gray scales and chromaticity changes of multiple white balance components is determined. A plurality of correspondence tables are stored in the timer controller.

Figure 7:
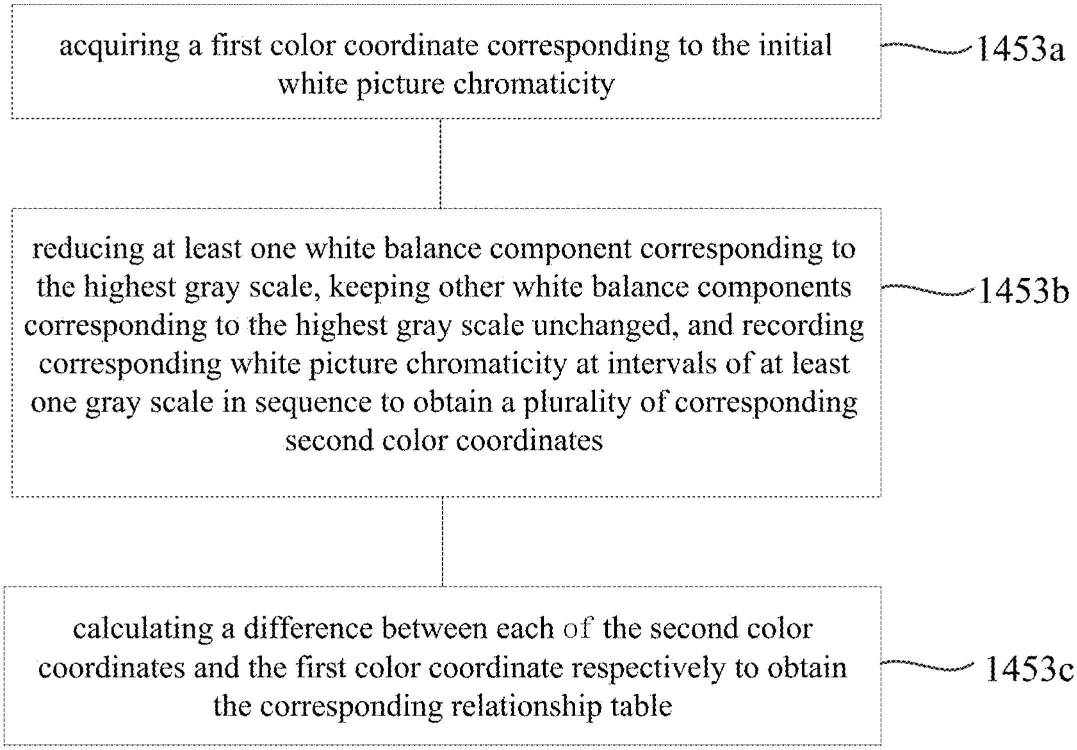
FIG. 7 is a flow diagram of step 1453 in FIG. 6 provided by the present application.

Specifically, the embodiments of the present application takes the corresponding relationship table of different gray scales and chromaticity changes configured with the blue pixel white balance component as an example, but it cannot be understood as a limitation of the present application. At this time, please refer to FIG. 7. FIG. 7 is a flow diagram of step 1453 in FIG. 6 provided by the present application. The step 1453 comprises the following steps:

1453*a*. acquiring a first color coordinate corresponding to the initial white picture chromaticity.

Specifically, when the picture of the display panel is white, obtain a color of a color point in the picture. And then substitute the color of the color point into the CIE 1931 color coordinate to obtain a first color coordinate of the chromaticity of the initial white picture. The first color coordinates comprise an x coordinate and a y coordinate.

It should be noted that TCON white balance code corresponding to the display panel will change the voltage of every gray scale and change the chromaticity. Therefore, the TCON white balance code needs to be turned off before the step 1453*a*, that is, the initial white balance data table is linear.

1453*b*. reducing at least one white balance component corresponding to the highest gray scale, keeping other white balance components corresponding to the highest gray scale unchanged, and recording a corresponding white picture chromaticity at intervals of at least one gray scale in sequence to obtain a plurality of corresponding second color coordinates.

Specifically, keep the red pixel white balance component and the green pixel white balance component in the initial white balance data table unchanged, and reduce the blue pixel white balance component. That is, keep the red pixel driving voltage and the green pixel driving voltage unchanged, and reduce the blue pixel driving voltage. Every time, the blue pixel white balance component is reduced by at least one gray scale. At a same time, after reducing the blue pixel white balance component, the adjusted pixel driving voltage corresponding to the highest gray scale is configured to drive the display panel to display the white picture, and the corresponding white picture chromaticity is recorded to obtain a plurality of corresponding second color coordinates. Every second color coordinate comprises an x coordinate and a y coordinate.

1053*c*. calculating a difference between each of the second color coordinates and the first color coordinate respectively to obtain the corresponding relationship table.

Specifically, Δx is obtained by subtracting the x coordinate corresponding to each second color coordinate from the x coordinate corresponding to the first color coordinate. And the y coordinate corresponding to the second color coordinate and the y coordinate corresponding to the first color coordinate are subtracted to obtain Δy.

Figure 9:
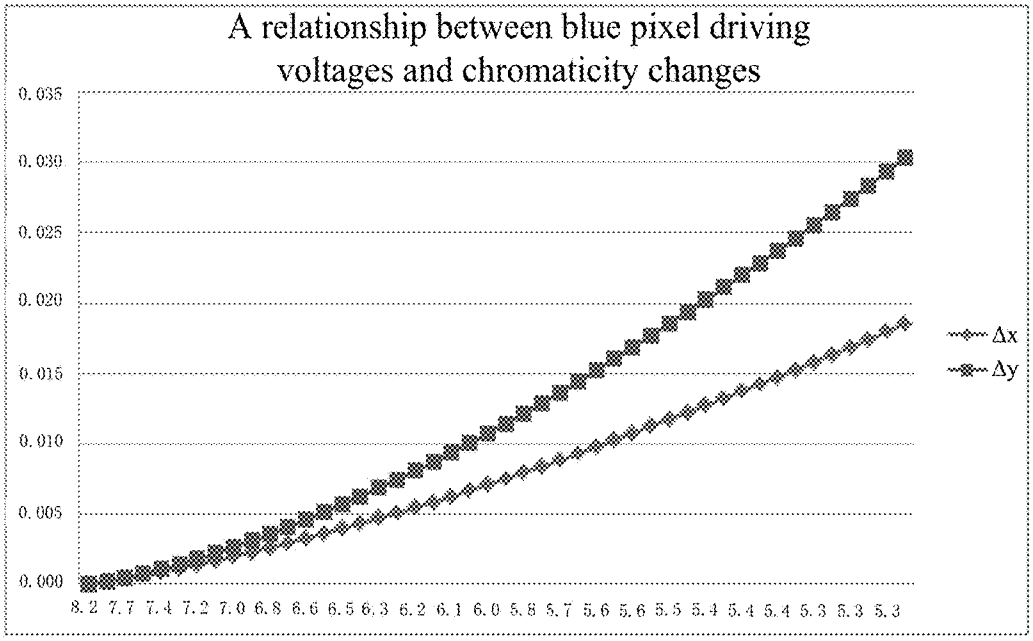
FIG. 9 is a schematic diagram of a relationship between blue pixel driving voltages and chromaticity changes provided by the present application.

For details, please refer to FIG. 8 and FIG. 9. FIG. 8 is a corresponding relationship table between different gray scales of a blue pixel white balance component and chromaticity changes provided in the present application. FIG. 9 is a schematic diagram of a relationship between blue pixel driving voltages and chromaticity changes provided by the present application.

As shown in FIG. 8 and FIG. 9, when the gray scale corresponding to the blue pixel white balance component corresponding to the highest gray scale (255 gray scale) changes, the driving voltage changes. The white picture chromaticity of the display panel also changes relative to the initial white picture chromaticity, as shown in the icon Δx and Δy.

1454. looking up the corresponding relationship table according to the difference between the initial white picture chromaticity and the target white picture chromaticity to match a corresponding one of the white balance component.

Specifically, when the initial white picture chromaticity deviates from the target white picture chromaticity, the deviation degree of the x coordinate and y coordinate of the white picture chromaticity can be determined according to the difference between the initial white picture chromaticity and the target white picture chromaticity. Then, the blue pixel gray scale matched with it is found in the corresponding relationship table, and then the blue pixel white balance component corresponding to the highest gray scale in the initial white balance data table is adjusted. Finally, the blue pixel white balance component corresponding to the highest gray scale is burned into TCON.

In this embodiment, the corresponding relationship table between different gray scales and chromaticity changes of each of the white balance components is pre-configured. The white balance component corresponding to the target white picture chromaticity can be quickly found according to the correspondence relationship table. Thus, a reaction speed of the TCON and chromaticity adjustment efficiency of the display panel are improved.

Figure 10:
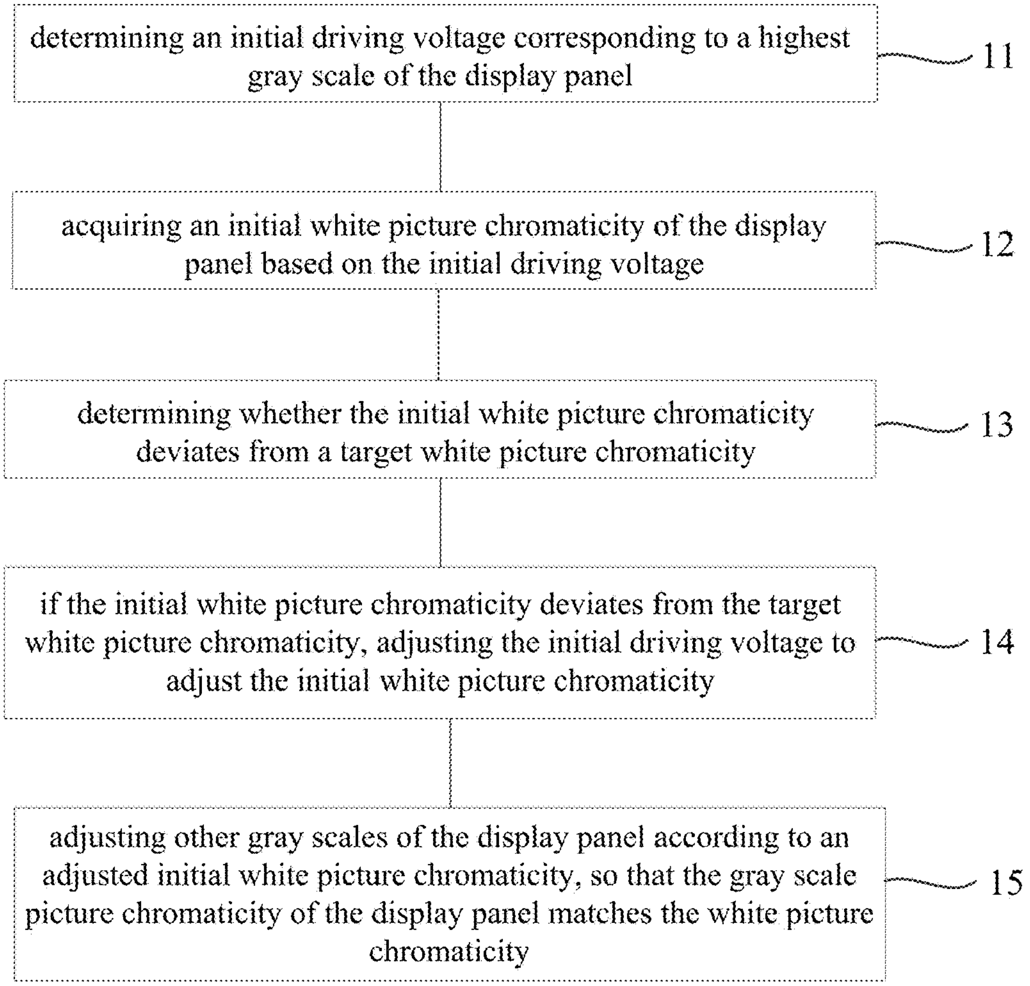
FIG. 10 is a second flow diagram of a chromaticity adjustment method of a display panel provided by the present application.

Please refer to FIG. 10. FIG. 10 is a second flow diagram of the chromaticity adjustment method of the display panel provided by the present application. A difference from the chromaticity adjustment method of the display panel shown in FIG. 1 is that in this embodiment, the chromaticity adjustment method of the display panel further comprises the following steps:

15. adjusting other gray scales of the display panel according to an adjusted initial white picture chromaticity, so that a gray scale picture chromaticity of the display panel matches a white picture chromaticity.

It is understood that white balance adjustment is a process of correcting white based on white when the sun is used as a light source. For example, for white in incandescent lamps, fluorescent lamps, etc. are used as light sources, adjustments such as red, blue, etc. are made. The target color dot is the above white. After adjusting the white balance components corresponding to the highest gray scale in the initial balance data table, take the adjusted white picture chromaticity as the target color point, and adjust the white balance components corresponding to other gray scales in the initial balance data table, so as to adjust the gray scale picture chromaticity of the display panel, so that the chromaticity of the gray scale picture matches the adjusted white picture chromaticity, thus completes the white balance adjustment.

In addition, there is no nonlinear relationship between brightness perceived by human eyes and an actual display brightness of the display panel. In low brightness environment, human eyes are more sensitive to a change of brightness, while in high brightness environment, the opposite is true. This characteristic of the human eyes is called gamma characteristics. Due to the non-linear perception of brightness by human eyes, if we need to obtain the brightness feeling of uniform changes, brightness displayed on the display panel needs non-uniform changes to adapt to the gamma characteristics of human eyes. Therefore, if brightness and gray scale of the display panel do not conform to a target gamma curve, the gamma voltage of the display panel needs to be corrected. In this embodiment, the target gamma curve may be a gamma curve with a gamma parameter of 2.2.

The embodiments of the present application make the adjusted initial white balance data table meet the target color point and target gamma curve, which can further improve a display effect and user experiences.

In order to better implement the above methods, the embodiments of the present application also provide a chromaticity adjustment device of the display panel.

Figure 11:
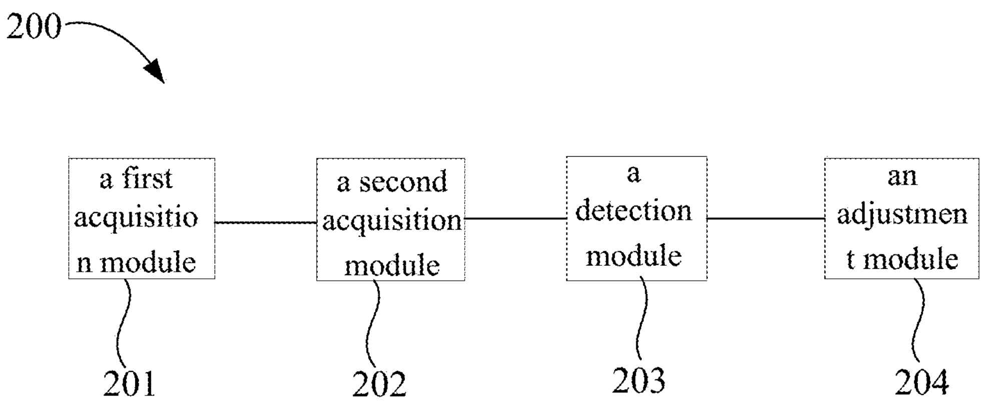
FIG. 11 is a structural diagram of a chromaticity adjustment device of a display panel provided by the present application.

Specifically, please refer to FIG. 11. FIG. 11 is a structural diagram of the display panel provided by the present application. The chromaticity adjustment device 200 of the display panel comprises a first acquisition module 201, a second acquisition module 202, a detection module 203, and an adjustment module 204. The details are as follows:

(1) A First Acquisition Module 201.

The first acquisition module 201 is configured to determine an initial driving voltage corresponding to a highest gray scale of the display panel. Specifically, the initial driving voltage corresponding to the highest gray scale can be determined according to the white picture transmission rate of the display panel. Or the initial driving voltage corresponding to the highest gray scale can be determined according to other display factors such as picture color saturation of the display panel, which will not be repeated here.

(2) A Second Acquisition Module 202.

The second acquisition module 202 is configured to acquire an initial white picture chromaticity of the display panel based on the initial driving voltage. Specifically, the initial driving voltage is configured to drive the display panel to display white picture. When a picture of the display panel is white, obtain a color of a color point in the picture, and then substitute the color of the color point into a CIE 1931 color coordinates to obtain a color coordinate of a chromaticity of the initial white picture.

(3) A Detection Module 203.

The detection module 203 is configured to determine whether the initial white picture chromaticity deviates from a target white picture chromaticity. Specifically, the detection module 203 subtracts an x coordinate of the initial white picture chromaticity from an x coordinate of the target white picture chromaticity, and subtracts a y coordinate of the initial white picture chromaticity from a y coordinate of the target white picture chromaticity, and determines whether the initial white picture chromaticity deviates from the target white picture chromaticity according to a difference obtained. For example, when the x and y coordinates of the initial white picture chromaticity are completely equal to the x and y coordinates of the target white picture chromaticity, it is determined that the initial white picture chromaticity does not deviate from the target white picture chromaticity. Alternatively, a preset value is set, and when each of the obtained differences is less than the preset value, it is determined that the initial white picture chromaticity does not deviate from the target white picture chromaticity.

(4) Adjustment Module 204.

The adjustment module 204 is configured to adjust the initial driving voltage to adjust the initial white picture chromaticity when the initial white picture chromaticity deviates from the target white picture chromaticity.

Specifically, in some embodiments, the adjustment module 204 can adjust directly at least one of the highest gray scales corresponding the red pixel driving voltage, the green pixel driving voltage, and the blue pixel driving voltage corresponding to the highest gray scale according to the difference between the initial white picture chromaticity and the target white picture chromaticity. In other embodiments, the adjustment module 204 can adjust at least one of the red pixel white balance component, the green pixel white balance component, and the blue pixel white balance component corresponding to the highest gray scale in the initial white balance table according to the difference between the initial white picture chromaticity and the target white picture chromaticity. In other embodiments, the adjustment module 204 can query the corresponding relationship table of different gray scales and chromaticity changes of at least one white balance component according to the difference between the initial white picture chromaticity and the target white picture chromaticity, so as to determine a white balance component corresponding to the highest gray scale in the initial white balance data table.

The present application provides a chromaticity adjustment device 200 of the display panel. The chromaticity adjustment device 200 of the display panel can adjust the initial driving voltage corresponding to the highest gray scale of the display panel to adjust the initial white picture chromaticity when the initial white picture chromaticity deviates from the target white picture chromaticity by configuring the first acquisition module 201, the second acquisition module 202, the detection module 203, and the adjustment module 204. Thus, without changing the design and manufacturing processes of the display panel, the white picture chromaticity of the display panel can be improved through optical debugging, so as to meet the customer's specification requirements for the white picture chromaticity of the module.

The application has been described by the relevant embodiments, however, the above embodiments are only examples of the implementation of the present invention. It must be noted that the disclosed embodiments do not limit the scope of the present invention. On the contrary, the modification and equalization of the spirit and scope included in the claims are included in the scope of the invention.

What is claimed is:

1. A chromaticity adjustment method of a display panel, comprising:

determining an initial driving voltage corresponding to a highest gray scale of the display panel;

acquiring an initial white picture chromaticity of the display panel based on the initial driving voltage;

determining whether the initial white picture chromaticity deviates from a target white picture chromaticity;

if the initial white picture chromaticity deviates from the target white picture chromaticity, the initial white picture chromaticity is lower than the target white picture chromaticity, and the initial driving voltage comprises a first pixel driving voltage, a second pixel driving voltage, and a third pixel driving voltage, adjusting the third pixel driving voltage to adjust the initial white picture chromaticity.

2. The chromaticity adjustment method of the display panel of claim 1, wherein a step of determining the initial driving voltage corresponding to the highest gray scale of the display panel comprises:

determining an initial driving voltage corresponding to a highest gray scale according to a white picture transmission rate of the display panel.

3. The chromaticity adjustment method of the display panel of claim 1, wherein a step of adjusting the third pixel driving voltage comprises:

reducing the third pixel driving voltage with a preset amplitude according to a difference between the initial white picture chromaticity and the target white picture chromaticity;

acquiring an adjusted initial white picture chromaticity, and determining the third pixel driving voltage if a difference between the adjusted initial white picture chromaticity and the target white picture chromaticity is less than a preset value;

if the difference between the adjusted initial white picture chromaticity and the target white picture chromaticity is greater than the preset value, continuing to reduce the third pixel driving voltage until the difference between the adjusted initial white picture chromaticity and the target white picture chromaticity is less than the preset value.

4. The chromaticity adjustment method of the display panel of claim 1, wherein the first pixel driving voltage is a red pixel driving voltage, the second pixel driving voltage is a green pixel driving voltage, and the third pixel driving voltage is a blue pixel driving voltage.

5. The chromaticity adjustment method of the display panel of claim 1, wherein a step of adjusting the initial driving voltage further comprises:

if the initial white picture chromaticity is higher than the target white picture chromaticity, and the initial driving voltage comprises the first pixel driving voltage, the second pixel driving voltage, and the third pixel driving voltage, adjusting the first pixel driving voltage and/or adjusting the second pixel driving voltage.

6. The chromaticity adjustment method of the display panel of claim 5, wherein the first pixel driving voltage is a red pixel driving voltage, the second pixel driving voltage is a green pixel driving voltage, and the third pixel driving voltage is a blue pixel driving voltage.

7. The chromaticity adjustment method of the display panel of claim 1, wherein a step of adjusting the initial driving voltage comprises:

acquiring an initial white balance data table of the display panel;

adjusting at least one white balance component corresponding to the highest gray scale in the initial white balance data table to adjust the initial driving voltage.

8. The chromaticity adjustment method of the display panel of claim 7, wherein a step of adjusting at least one white balance component corresponding to the highest gray scale in the initial white balance data table comprises:

obtaining a red pixel white balance component, a green pixel white balance component, and a blue pixel white balance component of the highest gray scale in the initial white balance data table;

adjusting at least one of the red pixel white balance component, the green pixel white balance component, and the blue pixel white balance component corresponding to the highest gray scale according to a difference between the initial white picture chromaticity and the target white picture chromaticity.

9. The chromaticity adjustment method of the display panel of claim 7, wherein a step of adjusting the at least one white balance component corresponding to the highest gray scale in the initial white balance data table of the display panel comprises:

pre-configuring a corresponding relationship table between different gray scales and chromaticity changes of the at least one white balance component;

looking up the corresponding relationship table according to a difference between the initial white picture chromaticity and the target white picture chromaticity to match a corresponding one of the white balance component.

10. The chromaticity adjustment method of a display panel of claim 9, wherein a step of pre-configuring the corresponding relationship table between the different gray scales and the chromaticity changes of the at least one white balance component comprises:

acquiring a first color coordinate corresponding to the initial white picture chromaticity;

reducing at least one white balance component corresponding to the highest gray scale, keeping other white balance components corresponding to the highest gray scale unchanged, and recording a corresponding white picture chromaticity at intervals of at least one gray scale in sequence to obtain a plurality of corresponding second color coordinates;

calculating a difference between each of the second color coordinates and the first color coordinate respectively to obtain the corresponding relationship table.

11. The chromaticity adjustment method of the display panel of claim 1, wherein the chromaticity adjustment method of the display panel further comprises:

adjusting other gray scales of the display panel according to an adjusted initial white picture chromaticity, so that a gray scale picture chromaticity of the display panel matches a white picture chromaticity.

12. A chromaticity adjustment method of a display panel, comprising:

determining an initial driving voltage corresponding to a highest gray scale according to a white picture transmission rate of the display panel;

acquiring an initial white picture chromaticity of the display panel based on the initial driving voltage;

determining whether the initial white picture chromaticity deviates from a target white picture chromaticity;

if the initial white picture chromaticity deviates from the target white picture chromaticity, the initial white picture chromaticity is lower than the target white picture chromaticity, and the initial driving voltage comprises a first pixel driving voltage, a second pixel driving voltage, and a third pixel driving voltage, adjusting the third pixel driving voltage to adjust the initial white picture chromaticity;

adjusting other gray scales of the display panel according to an adjusted initial white picture chromaticity, so that a gray scale picture chromaticity of the display panel matches a white picture chromaticity.

13. The chromaticity adjustment method of the display panel of claim 12, wherein a step of adjusting the third pixel driving voltage comprises:

reducing the third pixel driving voltage with a preset amplitude according to a difference between the initial white picture chromaticity and the target white picture chromaticity;

acquiring an adjusted initial white picture chromaticity, and determining the third pixel driving voltage if a difference between the adjusted initial white picture chromaticity and the target white picture chromaticity is less than a preset value;

if the difference between the adjusted initial white picture chromaticity and the target white picture chromaticity is greater than the preset value, continuing to reduce the third pixel driving voltage until the difference between the adjusted initial white picture chromaticity and the target white picture chromaticity is less than the preset value.

14. The chromaticity adjustment method of the display panel of claim 12, wherein the first pixel driving voltage is a red pixel driving voltage, the second pixel driving voltage is a green pixel driving voltage, and the third pixel driving voltage is a blue pixel driving voltage.

15. The chromaticity adjustment method of the display panel of claim 12, wherein a step of adjusting the initial driving voltage comprises:

acquiring an initial white balance data table of the display panel;

adjusting at least one white balance component corresponding to the highest gray scale in the initial white balance data table to adjust the initial driving voltage.

16. The chromaticity adjustment method of the display panel of claim 15, wherein a step of adjusting the at least one white balance component corresponding to the highest gray scale in the initial white balance data table comprises:

obtaining a red pixel white balance component, a green pixel white balance component, and a blue pixel white balance component of the highest gray scale in the initial white balance data table;

adjusting at least one of the red pixel white balance component, the green pixel white balance component, and the blue pixel white balance component corresponding to the highest gray scale according to a difference between the initial white picture chromaticity and the target white picture chromaticity.

17. The chromaticity adjustment method of the display panel of claim 16, wherein the step of adjusting the at least one white balance component corresponding to the highest gray scale in the initial white balance data table of the display panel comprises:

pre-configuring a corresponding relationship table between different gray scales and chromaticity changes of the at least one white balance component; and looking up the corresponding relationship table according to the difference between the initial white picture chromaticity and the target white picture chromaticity to match a corresponding one of the white balance component.

* * * * *